(12) United States Patent
Brunetti et al.

(10) Patent No.: US 9,464,720 B2
(45) Date of Patent: Oct. 11, 2016

(54) ANNULAR SEALING ASSEMBLY, IN PARTICULAR FOR WHEEL HUBS

(71) Applicants: Marco Brunetti, Turin (IT); Claudio Foti, Poirino (IT); Andrea Serafini, Pinerolo (IT)

(72) Inventors: Marco Brunetti, Turin (IT); Claudio Foti, Poirino (IT); Andrea Serafini, Pinerolo (IT)

(73) Assignee: AKTIEBOLAGET SKF, Gothenburg (SE)

(*) Notice: Subject to any disclaimer, the term of this patent is extended or adjusted under 35 U.S.C. 154(b) by 52 days.

(21) Appl. No.: 14/456,623

(22) Filed: Aug. 11, 2014

(65) Prior Publication Data

US 2016/0039246 A1 Feb. 11, 2016

Related U.S. Application Data

(63) Continuation-in-part of application No. 13/079,587, filed on Apr. 4, 2011, now abandoned, which is a continuation of application No. 12/225,553, filed as application No. PCT/IT2006/000171 on Mar. 20, 2006, now abandoned.

(51) Int. Cl.
*F16J 15/3256* (2016.01)
*F16J 15/32* (2016.01)
*F16C 33/78* (2006.01)

(52) U.S. Cl.
CPC ........ *F16J 15/3256* (2013.01); *F16C 33/7869* (2013.01)

(58) Field of Classification Search
CPC ............... F16J 15/3268; F16J 15/3216; F16J 15/3232; F16J 15/3264; F16J 15/3256
See application file for complete search history.

(56) References Cited

U.S. PATENT DOCUMENTS

| | | | | |
|---|---|---|---|---|
| 6,213,476 B1* | 4/2001 | Chandler | ............. | F16J 15/3244 277/562 |
| 6,273,428 B1* | 8/2001 | Sassi | ................... | F16J 15/3256 277/348 |
| 6,357,757 B1* | 3/2002 | Hibbler | ............... | F16J 15/4476 277/350 |
| 6,450,503 B1* | 9/2002 | Dossena | ............. | F16J 15/3256 277/549 |
| 7,675,212 B2* | 3/2010 | Kobayashi | ............. | F16J 15/326 277/317 |
| 7,770,896 B2* | 8/2010 | Foti | ...................... | F16J 15/3264 277/353 |
| 8,720,904 B2* | 5/2014 | Rossi | .................. | F16J 15/3256 277/549 |
| 9,074,689 B2* | 7/2015 | Duch | ................... | F16J 15/3232 |
| 2004/0046328 A1* | 3/2004 | Ichiman | ............. | F16C 33/7879 277/423 |
| 2007/0222161 A1* | 9/2007 | Voydatch | ............. | F16J 15/3264 277/551 |

(Continued)

*Primary Examiner* — Kristina Fulton
*Assistant Examiner* — Eugene G Byrd
(74) *Attorney, Agent, or Firm* — Bryan Peckjian; SKF USA Inc. Patent Dept.

(57) ABSTRACT

A sealing assembly comprises a first annular shield presenting an axial sleeve portion for the mounting angularly integral with one of said members, and a flange portion which radially extends from a first end of the sleeve portion, and a sealing member made of elastomeric material presenting an annular root portion, which overhangingly and radially extends from a peripheral edge of the flange portion and a first axially sealing annular lip, as well as a second radially sealing annular lip. The lips extend overhangingly and axially on the opposite side of the first end of the sleeve portion, from a same side as a thinned end of the root portion and are reciprocally and divergingly arranged to form in radial section a V-shape having a vertex facing towards the root portion and an axis parallel to the sleeve portion.

7 Claims, 4 Drawing Sheets

(56) References Cited

U.S. PATENT DOCUMENTS

| | | | | |
|---|---|---|---|---|
| 2007/0290451 A1* | 12/2007 | Yager | F16J 15/3256 | 277/551 |
| 2009/0206553 A1* | 8/2009 | Kanzaki | F16J 15/3256 | 277/351 |
| 2010/0007090 A1* | 1/2010 | Kobayashi | F16J 15/326 | 277/351 |
| 2010/0046873 A1* | 2/2010 | Takimoto | F16J 15/3264 | 384/478 |
| 2010/0059937 A1* | 3/2010 | Castleman | F16J 15/3236 | 277/309 |
| 2010/0066029 A1* | 3/2010 | Kobayashi | F16C 33/7876 | 277/361 |
| 2011/0006485 A1* | 1/2011 | Nakagawa | F16J 15/164 | 277/549 |
| 2011/0260409 A1* | 10/2011 | Battles | F16J 15/3268 | 277/300 |
| 2012/0098208 A1* | 4/2012 | Yamamoto | F16J 15/14 | 277/549 |
| 2013/0001885 A1* | 1/2013 | Nosenzo | F16J 15/3256 | 277/500 |
| 2013/0243359 A1* | 9/2013 | Shibata | F16C 33/7823 | 384/486 |
| 2013/0322791 A1* | 12/2013 | Dlugai | F16J 15/164 | 384/91 |

* cited by examiner

ANNULAR SEALING ASSEMBLY, IN PARTICULAR FOR WHEEL HUBS

RELATED APPLICATIONS

This is a continuation in part application that claims priority to a continuation application Ser. No. 13/079,587 filed on Apr. 4, 2011, which claims priority to non-provisional application Ser. No. 12/225,553 filed on Sep. 22, 2008, which further claims priority to International Application No. PCT/IT2006/000171 filed on Mar. 20, 2006, all of which are incorporated herewith by reference in their entirety.

TECHNICAL FIELD

The present invention relates to an annular seal assembly of the type intended to protect the rolling bearings of a wheel hub from external contaminants, such as water, dust, mud, with which the wheel hub is constantly in contact during the operative life.

In particular, the sealing assembly of the invention is suitable for advantageously equipping a hub bearing unit of a known type, whose hub and spindle functions are performed by the rings of a rolling bearing, which are appropriately flanged so as to receive on one side a wheel of a vehicle and on the other be fastened to the upright of a vehicle suspension.

BACKGROUND ART

It is known that, in automotive applications, the rolling bearings, in particular those present in wheel hubs, and more in particular those forming the hub bearing unit of the aforesaid type, are continuously exposed, in use, to the contact with high quantities of contaminants: therefore, in such applications, the sealing assemblies used to protect the bearings (incorporated in the bearings themselves or, more frequently, belonging to the hub-bearing unit) in addition to the purpose of withholding the lubricant oil or grease within the bearing, above all have the purpose of preventing external contaminants from entering inside the wheel hub and/or the bearing.

Unfortunately, contaminants such as dust and mud, also if blocked by the sealing assembly, tend to blend with the grease lubricating the sealing lips and wear the latter off until they lose their entire sealing capacity. To overcome such drawback, the sealing assemblies known for the described applications present a main radial sealing lip and, more outwards, a dust lip for preserving the main lip from the contact with contaminants.

However, to avoid a rapid wear thereof, the anti-dust lips are usually designed so as to fit with the sealing surface on which the main lip cooperates by interference, with very low interference or even with minor clearance. In this way, however, the lubricant grease possibly placed between the two lips is easily lost outwards and the external contaminants, also if in minimum amount, may come into contact with the main sealing lip and cause consequent wear of the same.

A solution of the problem consists in shaping the anti-dust lip so as to "pump" the contaminants outwards. However, such solution is no longer satisfying in view of the longer life required by the members.

BACKGROUND OF THE INVENTION

Fluid seals assemblies of various types are used in numerous applications including and not limited to sealing vehicular engine crankshafts, transmission shafts, bearing lubrication systems, compressor shaft support assemblies, and the like. The fluid seal assembly is designed to retain and seal oil or grease in a predetermined location for lubricating the shaft and to prevent ingress of environmental contaminants.

DISCLOSURE OF INVENTION

It is the object of the present invention to provide a sealing assembly for demanding applications, for example vehicle wheel hubs, which is capable of ensuring, also in the presence of high doses of external contaminants and preserving, at the same time, a low production cost, a high sealing efficiency and, above all, which is capable of maintaining such high efficiency essentially unvaried also with the progressive wear of the sealing lip.

According to the invention, it is therefore provided a sealing assembly insertable between two relatively rotating members to fluid-tightly seal a compartment defined between said members from an external environment to the compartment itself, as defined in claim 1.

In particular, the sealing assembly comprises a first annular shield presenting an axial sleeve portion for the mounting angularly integral with one of said members, and a flange portion which radially extends from a first end of the sleeve portion; and a sealing member made of elastomeric material presenting an annular root portion which overhangingly and radially extends from a peripheral edge of the flange portion and a first axially sealing annular lip, as well as a second radially sealing annular lip, said lips overhangingly and axially extending on the opposite side of the first end of the sleeve portion, from a same side as a thinned end of the root portion and being reciprocally and divergingly arranged to form in radial section a V-shape having a vertex facing towards the root portion and an axis parallel to the sleeve portion.

The lips present respective V-shaped sealing edges and the first lip also presents a radial seat facing the opposite side of the second lip and accommodating a toroidal spring applying on the first lip an offset radial stress to an elastic hinge defined by the thinned end of the root portion and having centre of rotation arranged on a line crossing the sealing edge of the first lip and forming with a radial plane an angle gamma in the range from 20.degrees to 60.degrees.

Furthermore, the sealing lips may be slidingly coupled with respective sealing surfaces of a second and third annular shields selectively arrangeable coaxial with the first shield and having similar dimensions, so that both the second and the third shield can be coupled to said first shield.

A solution of the problem consists in shaping the anti-dust lip so as to "pump" the contaminants outwards. However, such solution is no longer satisfying in view of the longer life required by the members.

BRIEF DESCRIPTION OF THE DRAWINGS

Further features and advantages of the present invention will be apparent in the description of the following non-limitative embodiment thereof, with reference to the accompanying drawings, in which.

DISCLOSURE OF INVENTION

Figure 1:
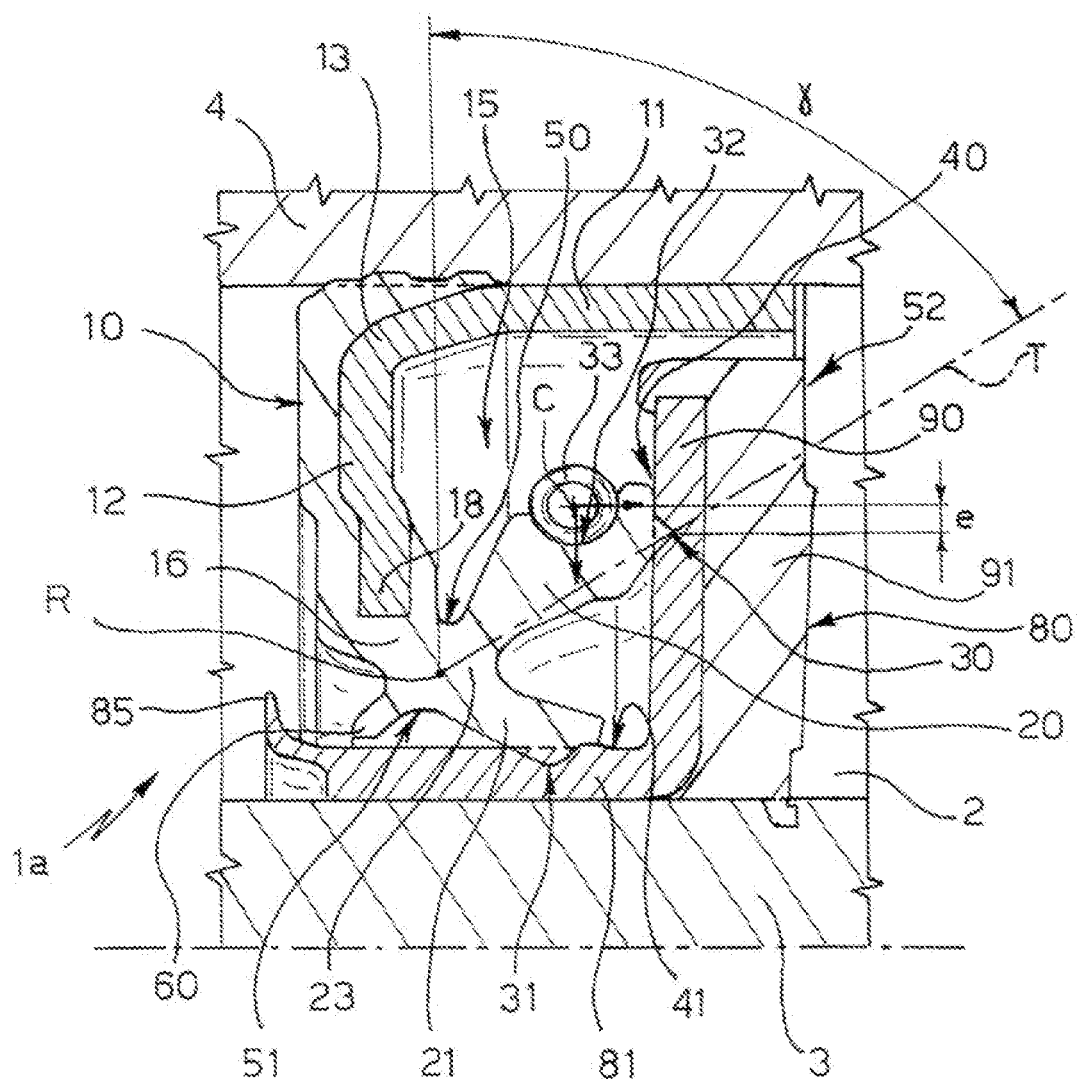
FIG. 1 shows an elevational view, in longitudinal radial section, of a first configuration of a sealing assembly made according to the invention.

It is the object of the present invention to provide a sealing assembly for demanding applications, for example vehicle wheel hubs, which is capable of ensuring, also in the presence of high doses of external contaminants and preserving, at the same time, a low production cost, a high sealing efficiency and, above all, which is capable of maintaining such high efficiency essentially unvaried also with the progressive wear of the sealing lip.

According to the invention, it is therefore provided a sealing assembly insertable between two relatively rotating members to fluid-tightly seal a compartment defined between said members from an external environment to the compartment itself, as defined in claim 1.

In particular, the sealing assembly comprises a first annular shield presenting an axial sleeve portion for the mounting angularly integral with one of said members, and a flange portion which radially extends from a first end of the sleeve portion; and a sealing member made of elastomeric material presenting an annular root portion which overhangingly and radially extends from a peripheral edge of the flange portion and a first axially sealing annular lip, as well as a second radially scaling annular lip, said lips overhangingly and axially extending on the opposite side of the first end of the sleeve portion, from a same side as a thinned end of the root portion and being reciprocally and divergingly arranged to form in radial section a V-shape having a vertex facing towards the root portion and an axis parallel to the sleeve portion.

The lips present respective V-shaped sealing edges and the first lip also presents a radial seat facing the opposite side of the second lip and accommodating a toroidal spring applying on the first lip an offset radial stress to an elastic hinge defined by the thinned end of the root portion and having centre of rotation arranged on a line crossing the sealing edge of the first lip and forming with a radial plane an angle .gamma. in the range from 20.degree. to 60.degree.

Furthermore, the sealing lips may be slidingly coupled with respective sealing surfaces of a second and third annular shields selectively arrangeable coaxial with the first shield and having similar dimensions, so that both the second and the third shield can be coupled to a same said first shield.

According to a feature of the invention, finally, the centre of application of said offset radial stress on the first lip is offset also with respect to said V-shaped sealing edge of the first lip, being arranged, with respect to the same, radially displaced closer to the sleeve portion of the first shield.

In this way, the external contaminants can reach the first lip, which forms the main sealing lip, only very difficultly and after a relative long working time because they are withheld by the second lip; furthermore, the wear of the latter does not have direct consequences on the sealing capacity of the sealing assembly entirely remitted to the first lip, also because the first lip, thanks to its particular geometry, is capable of maintaining a constant and unaltered sealing action also facing relatively high wear of the same.

In practice, the first lip of the sealing assembly of the invention makes, given some differences related to the specific application for which it is intended, a seal similar, according to the characteristics of the sealing edge, to that which can be obtained in sealing assemblies made according to the teachings of EP0980999, which, however, are intended for an entirely different application, i.e. for assembly between a diesel or petrol engine vehicle crankshaft and the crankcase and/or the oil sump, for withholding the oil, i.e. for application in a "clean" environment and at relative high speeds.

According to the invention, instead, a variant of such technology is now applied to a completely different field ("dirty" environment and relatively slow speeds).

BEST MODE FOR CARRYING OUT THE INVENTION

Figure 3:
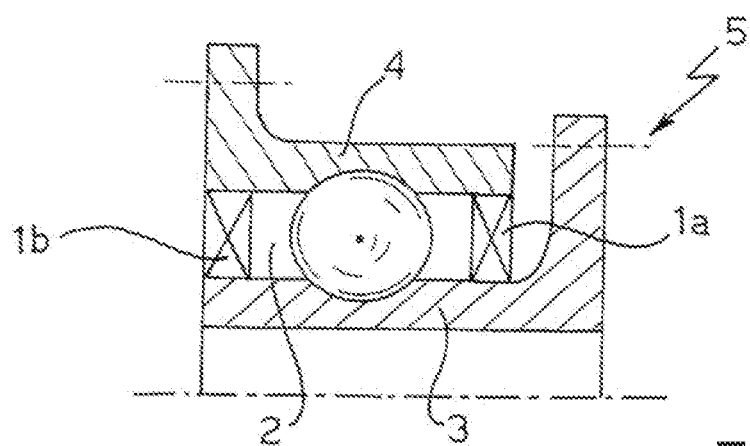
FIG. 3 schematically shows a hub bearing unit provided with the sealing assemblies in FIGS. 1 and 2.

With reference to figures from 1 to 3, number 1 indicates a sealing assembly insertable in a compartment 2 defined between two relatively rotating members 3, 4, in particular the inner 3 and outer 4 rings of a hub bearing unit 5 (FIG. 3) for vehicles, to isolate the compartment 2 from the outside environment.

The sealing assembly 1 comprises a first annular shield 10 presenting an axial sleeve portion 11 for angularly and integrally mounting with one of said members, in the case in point with the outer ring 4, and a flange portion 12 which radially extends from a first end 13 of the sleeve portion 11.

The sealing assembly 1 further comprises a sealing member 15 integrally carried by the shield 10 and made of elastomeric material (for example a natural or synthetic rubber) presenting an annular root portion 16 which radially and overhangingly protrudes from a peripheral edge 18 of the sleeve portion 10, a first axial sealing annular lip 20 and a second radial sealing axial lip 21.

Lips 20 and 21 axially and overhangingly extend on the opposite side of end 13 of the sleeve portion 11, from a same side as a thinned end 23 of the root portion 16 and are reciprocally and divergingly arranged to form in radial section a V-shape having a vertex facing towards the root portion 16 and an taxis parallel to the sleeve portion 11.

Figure 2:
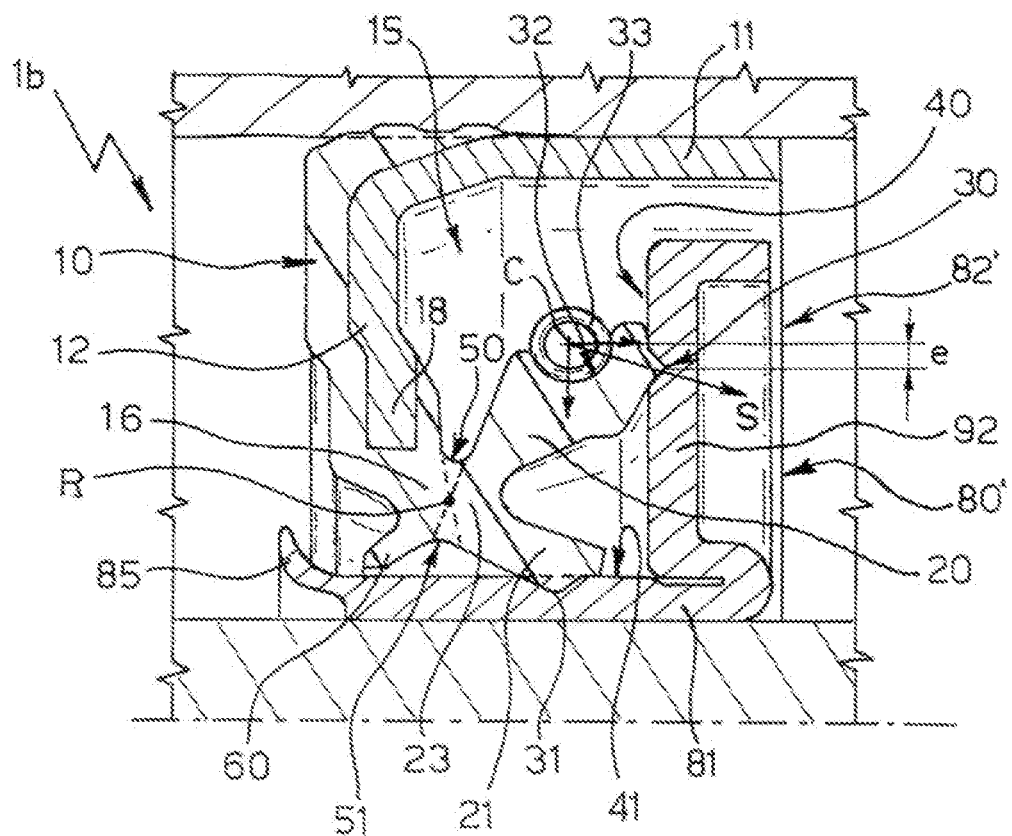
FIG. 2 shows an elevational view, in longitudinal radial section, of a second configuration of a sealing assembly made according to the invention.

Each of the lips 20, 21 presents respective V-shaped sealing edges 30, 31 and lip 20 also presents a radial seat 32 facing the opposite side of lip 21 and accommodating a toroidal spring 33 mounted so as to apply on lip 20 a radial stress, indicated by the arrow in FIGS. 1 and 2, offset to an elastic hinge defined by the thinned end 23 of the root portion 16 and having centre of rotation R arranged on a line T crossing the sealing edge 30 of lip 20 (indicated by a dash-dotted line in FIG. 1) and forming with a radial plane an angle .gamma. in the range from 20.degree. to 60.degree.

According to a feature of the invention, the sealing lips 20, 21 are slidingly engageable, by means of V-shaped edges 30, 31, with respective sealing surfaces 40, 41 of either a second shield 80 (FIG. 1) or a third annular shield 80' (FIG. 2), both selectively arrangeable coaxial with the shield 10 and having similar dimensions.

The centre of application, indicated by C in FIGS. 1 and 2, of the mentioned offset radial stress applied by the spring 33 on the lip 20 is, according to a further feature of the invention, offsetly arranged with an offset equal to "e", also with respect to the V-shaped sealing edge 30 of the lip 20, in the sense that it is arranged in a displaced position radially closer to the sleeve portion 11 of the first shield 10 with respect to the sealing edge 30. By effect of the doubly offset position of point C with respect both to point R and edge 30, the pure axial component of the stress applied by the spring 33 to the lip 20 does not cross the edge 30; consequently, an oblique resultant forming an angle with the sleeve portion 11 will cross the same in use.

The lips 20, 21 are delimited towards the thinned end 23 of the annular root portion 16, and on the opposite side, by respective annular grooves 50 having semicircular profile in radial section, which equally delimit and define the thinned end 23; the centre of rotation R of the elastic hinge defined by such tapered end 23 of the annular root portion 16 is chosen so as to be found at the intersection of opposite lines tangent to the profile of the grooves 50, 51, schematically indicated in FIG. 2 by broken lines. The groove 50 is defined between the first axial sealing lip 20 and the peripheral root portion 16 and the groove 51 is defined between the second axial sealing lip 21 and the third sealing lip 60. In addition, a third groove, generally indicated at 100, is defined between the first axial sealing lip 20 and the second axial sealing lip 21. A forth groove, generally indicated at 102, is defined between the second axial sealing lip 21 and the peripheral root portion 16.

The sealing member 15 further presents a third lip 60, shaped as an anti-dust lip, which extends in direction opposite to lip 20 and on the same side as lip 21, overhangingly from the root portion 16; the latter extending also overhangingly and obliquely with respect to the flange portion 12, from the edge 18, in the same direction as the second lip 21 so that, in radial direction, the root portion 16 and the lips 20, 21 and 60 essentially form an X-shape, having the centre of rotation R for the lip 20 essentially arranged in the middle of the X-shape.

Figure 4:
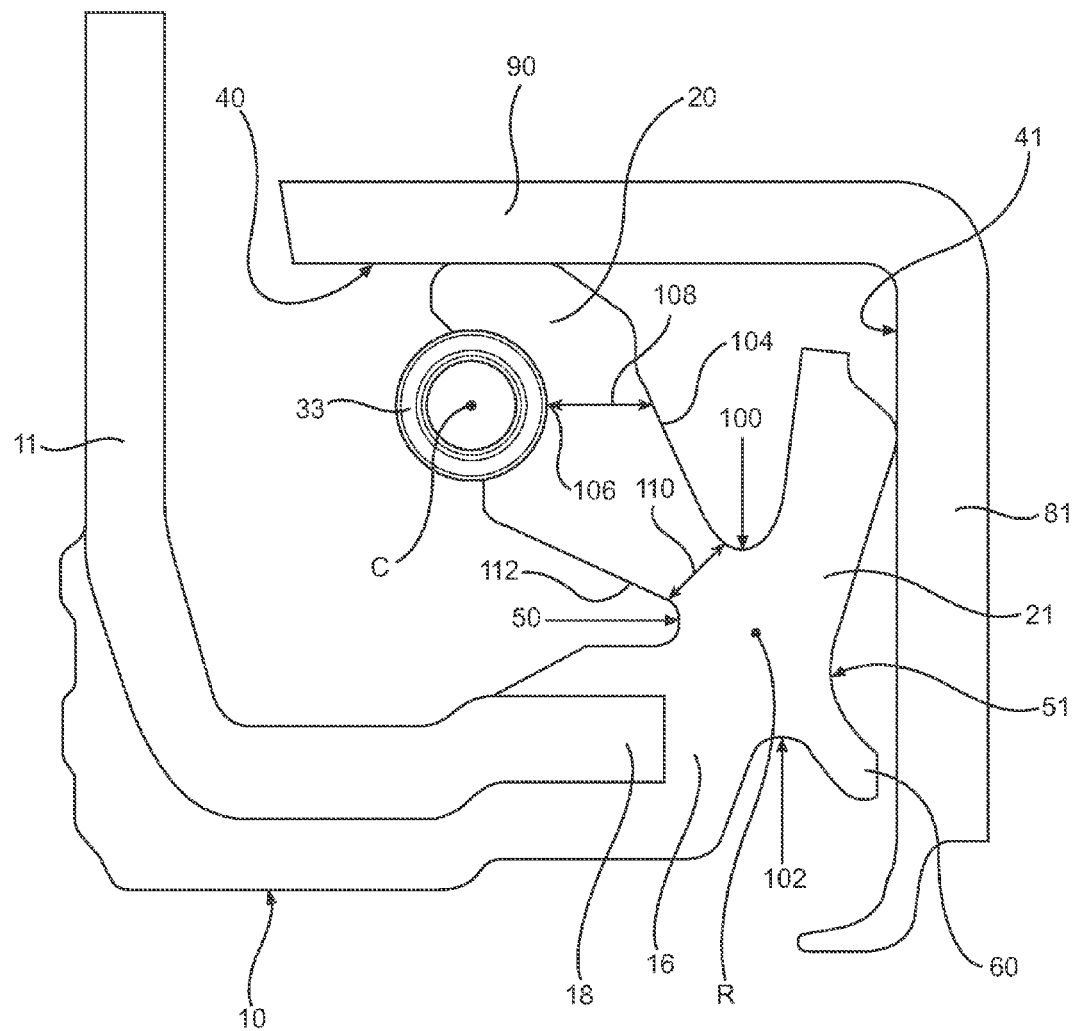
FIG. 4 shows a cross sectional view of the first configuration of the sealing assembly made according to the invention.

With reference to FIG. 4, to provide improved flexibility of the first axial sealing lip 20 and remove stress from the spring 33, as the first axial sealing lip 20 flexes towards a sleeve portion 81, the cross section of the first axial sealing lip 20 is fabricated in a way that, as viewed in a cross section, a first distance, shown at 108, defined between a point 106 defined in a groove of the outer surface 112 of the first axial sealing lip 20, wherein the spring 33 rests on, and the inner surface 104 of the first axial sealing lip 20 is substantially equal to a second distance 110, defined at a lower portion of the first axial sealing lip 20 between the outer surface 112 and the inner surface 104 of the first axial sealing lip 20. This dimensional structure of the first axial sealing lip 20 provides for the first distance 108 and the second distance 110 to be substantially equal to improve flexibility of the first axial sealing lip 20 at the elastic hinge defined by the tapered or thinned end 23 of the annular root portion 16.

With reference to FIGS. 1 and 2, the first shield 10 may be coupled, according to an aspect of the invention, either with a second annular shield 80, forming a sealing assembly of configuration 1a (FIG. 1), or with a third annular shield 80' forming a sealing assembly of configuration 1b (FIG. 2).

Both shields 80 and 80' each present in radial section an essentially L-shape comprising the sleeve portion 81 for an assembly angularly integral with the other of said members, in the case in point the inner ring 3, and a flange portion 82, 82', arranged in use facing and opposite the respective sleeve 11 and flange 12 portions of the first shield 10.

The lips 20 and 21, as it is schematically shown off-scale in FIGS. 1 and 2 (in which lips 20, 21 are shown in undeformed configuration), slidingly cooperate with a predetermined interference, respectively, with the flange portion 82, 82' and the sleeve portion 81 of, selectively, either the second shield 80 or the third shield 80'.

In both cases, the sleeve portion 81 of the shield 80, 80' presents on the opposite side of the respective flange portion 82, 82', an edge 85 folded towards the flange portion 12 of the first shield 10, shaped so as to form in use a centrifuge element or flinger of contaminants possibly present in the environment outside the space 2 and dimensioned so as to shield the third anti-dust lip 60 towards said outer environment, so as to protect it.

Figure 5:
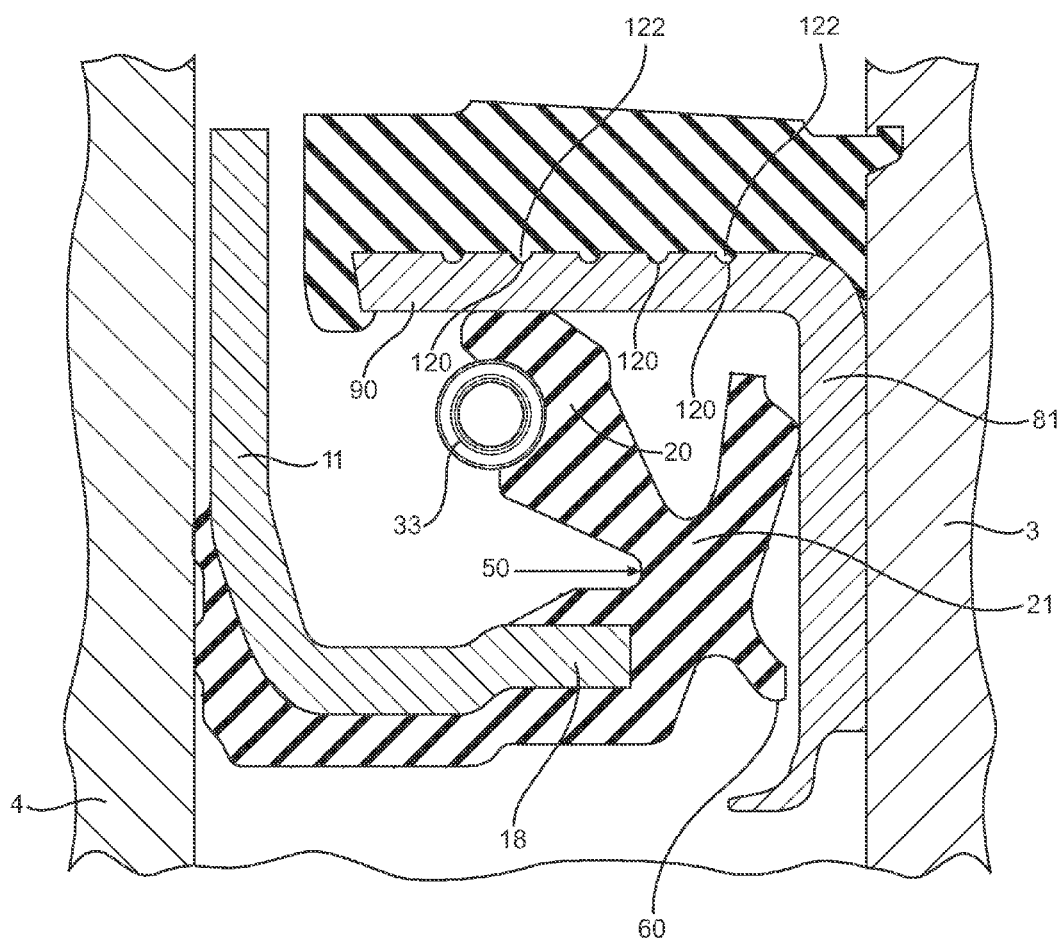
FIG. 5 shows yet another cross sectional view of the first configuration of the sealing assembly defining mechanical engagement between the metallic armature of the sleeve portion and the magnetic elastomeric ring.

The flange portion 82 of the second shield 80 includes, on the side opposite the first shield 10, an essentially flat metallic element, i.e. an armature 90 carrying a magnetic elastomeric ring 91 defining a phonic wheel. With reference to FIG. 5, the essentially flat metallic armature 90 includes a plurality of grooves 120 defined on the outer surface of the armature 90 that contacts with the elastomeric ring 91. These grooves 120 are used to receive the elastomeric material 122 into the grooves 120 to define a mechanical connection therebetween.

Conversely, the flange portion 82' of the third shield 80' is defined by a coined metallic armature 92 presenting a U-shaped fold at the sleeve portion 81 and a L-shaped fold at its peripheral edge, so as to present the same axial dimensions as the flange portion 82 of the second shield 80, so that the second and third shields can both either be coupled to the same first shield 10.

Thanks to the structure described in detail, by performing a mathematical and geometrical breakdown of the forces acting on lip 20 it is possible to demonstrate that the load S (FIG. 2) acting on the sealing edge 30 is oblique and essentially independent of the width of the area actually in contact between the edge 30 and the surface 40, both of minor axial variations of positions of the edge 30, whereby the sealing action is maintained essentially constant also with the progressive wear of the lip 20.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A sealing assembly insertable in a compartment defined by members of a hub bearing unit rotatable relative to each other to isolate the compartment from the external environment, the sealing assembly comprising:
   a sleeve portion disposed between the members of the hub bearing unit and having a first sleeve portion positioned axially along one of the members and having a first sleeve portion end, the sleeve portion further comprising an edge extending from the first sleeve portion end, the edge extending radially outwardly and axially away from the first sleeve portion and having a thickness less than a first sleeve portion thickness when viewing the sealing assembly in cross section, wherein the edge extends from and is connected to a radially outermost part of the first sleeve portion end such that the edge does not directly contact a radially innermost part of the first sleeve portion end;

a first annular shield presenting an axial sleeve portion having a first end and mounted angularly and integrally with one of the members and a flange portion extending radially from said first end to a peripheral edge;

a sealing member made of elastomeric material presenting an annular root portion extending radially and overhangingly from said peripheral edge;

a first axial sealing annular lip presenting a sealing edge and a seat to receive a spring mounted so as to apply on said first axial sealing annular lip a radial stress to an elastic hinge defined by a thinned end of the annular root portion and having a center of rotation arranged on a line crossing said sealing edge;

a second radial sealing lip extending overhangingly from said thinned end of said annular root portion on the opposite side of said first end of said axial sleeve portion for slidingly engaging said sleeve portion disposed between the members; and a third lip extending overhangingly from said annular root portion in a direction opposite from said first axial sealing annular lip and obliquely with respect to said flange portion thereby forming an X-shape defined between said first axial sealing annular lip, said second sealing radial sealing lip, and said root portion having the centre of rotation for said first axial sealing annular lip arranged in the middle of said X-shape to constantly maintain sealing action even with progressive wear of said first axial sealing annular lip as load is applied to said sealing edge, wherein the edge radially overlaps at least a portion of the third lip, and wherein an outermost radial part of the edge is less than an innermost radial part of the flange portion of the first annular shield; and said first axial sealing annular lip presenting a cross section having a first distance defined between an outer surface of said first axial sealing annular lip at said seat and an inner surface of said first axial sealing annular lip being substantially equal to a second distance defined at said thinned end of said first axial sealing annular lip between said outer surface and said inner surface of said first axial sealing annular lip thereby improving flexibility of said first axial sealing annular lip at the elastic hinge defined by said thinned end of said annular root portion.

2. The sealing assembly as set forth in claim 1, wherein said first axial sealing annular lip and said second radial sealing lip slidingly couple a second annular shield of said sleeve portion.

3. The sealing assembly as set forth in claim 1, wherein a centre of application of radial stress on said first axial sealing annular lip is offset also with respect to said sealing edge.

4. The sealing assembly as set forth in claim 1, wherein said first axial sealing annular lip and said second radial sealing lip are defined, towards said thinned end of said annular root portion and on the opposite side, by respective annular grooves having semicircular profile in radial section, the centre of rotation of said elastic hinge defined by said thinned end of said annular root portion being located at the intersection of opposite lines tangent to the profile of said annular grooves.

5. The sealing assembly as set forth in claim 1, wherein the sleeve portion includes a second flange portion extending from a second end of the first sleeve portion, the second flange portion comprising a first axially extending flange portion directly connected to the second end and extending towards the edge such that the first axially extending flange portion and the first sleeve portion form a U-shape, the second flange portion further comprising a radially extending flange portion extending from the first axially extending flange portion such that the radially extending flange portion is entirely axially overlapped by the first sleeve portion, the second flange portion further comprising a second axially extending flange portion extending from the outermost radial portion of the radially extending flange portion and extending axially away from the edge.

6. The sealing assembly as set forth in claim 1, wherein said sleeve portion includes a flange portion of a second shield includes a metallic element carrying an elastomeric ring, said metallic element including a plurality of grooves defined on an outer surface of said metallic element contacting said elastomeric ring, wherein said plurality of grooves receive said elastomeric ring to define a mechanical connection therebetween.

7. A sealing assembly insertable in a compartment defined by members of a hub bearing unit rotatable relative to each other to isolate the compartment from the external environment, the sealing assembly comprising:

a first annular shield presenting an axial sleeve portion having a first end and mounted angularly and integrally with one of the members and a flange portion extending radially from said first end to a peripheral edge;

a sleeve portion disposed between the members of the hub bearing unit having a first sleeve portion positioned axially along one of the members and having a first sleeve portion end, the sleeve portion further comprising an edge extending from the first sleeve portion end, the edge extending radially outwardly and axially away from the first sleeve portion and having a thickness less than a first sleeve portion thickness when viewing the sealing assembly in cross section, wherein the edge extends from and is connected to a radially outermost part of the first sleeve portion end such that the edge does not directly contact a radially innermost part of the first sleeve portion end, said sleeve portion includes a second flange portion having a metallic element thereon carrying an elastomeric ring, said metallic element includes a plurality of grooves defined on an outer surface of said metallic element contacting said elastomeric ring, wherein said plurality of grooves receive said elastomeric ring to define a mechanical connection therebetween;

a sealing member made of elastomeric material presenting an annular root portion extending radially and overhangingly from said peripheral edge;

a first axial sealing annular lip presenting a sealing edge and a seat to receive a spring mounted so as to apply on said first axial sealing annular lip a radial stress to an elastic hinge defined by a thinned end of the annular root portion and having a center of rotation arranged on a line crossing said sealing edge forming with a radial plane an angle γ in the range from 20° to 60°;

a second radial sealing lip extending overhangingly from said thinned end of said annular root portion on the opposite side of said first end of said axial sleeve portion for slidingly engaging said sleeve portion disposed between the members, said first axial sealing annular lip and said second radial sealing lip slidingly couple a second annular shield of said sleeve portion;

said first axial sealing annular lip and said second radial sealing lip are defined, towards said thinned end of said annular root portion and on the opposite side, by respective annular grooves having semicircular profile in radial section, the centre of rotation of said elastic hinge defined by said thinned end of said annular root portion being located at the intersection of opposite lines tangent to the profile of said annular grooves, said first axial sealing annular lip presenting a cross section having a first distance defined between an outer surface of said first axial sealing annular lip at said seat and an inner surface of said first axial sealing annular lip being substantially equal to a second distance defined at said thinned end of said first axial sealing annular lip between said outer surface and said inner surface of said first axial sealing annular lip thereby improving flexibility of said first axial sealing annular lip at the elastic hinge defined by said thinned end of said annular root portion; and a third lip extending overhangingly from said annular root portion in a direction opposite from said first axial sealing annular lip and obliquely with respect to said flange portion thereby forming an X-shape defined between said first axial sealing annular lip, said second sealing radial sealing lip, and said root portion having the centre of rotation for said first axial sealing annular lip arranged in the middle of said X-shape to constantly maintain sealing action even with progressive wear of said first axial sealing annular lip as load is applied to said sealing edge, wherein the edge radially overlaps at least a portion of the third lip, and wherein an outermost radial part of the edge is less than an innermost radial part of the flange portion of the first annular shield.

* * * * *